United States Patent [19]
Ransom

[11] Patent Number: 5,193,449
[45] Date of Patent: Mar. 16, 1993

[54] HAY BALER

[76] Inventor: Woodbury S. Ransom, 14 Elm Rd., Bolinas, Calif. 94924

[21] Appl. No.: 616,545

[22] Filed: Nov. 21, 1990

[51] Int. Cl.$^5$ ............................................ A01D 39/00
[52] U.S. Cl. ................................... 100/5; 100/18; 100/80; 100/98 A; 100/189; 100/187; 56/344
[58] Field of Search .............. 100/5, 8, 17, 18, 76, 100/78, 80, 81, 98 A, 179, 180, 187, 248, 249, 251, 189; 56/344

[56] References Cited

U.S. PATENT DOCUMENTS

| | | | |
|---|---|---|---|
| 307,200 | 10/1884 | Keene | 100/80 |
| 648,039 | 4/1900 | Medlin | 100/4 |
| 928,563 | 7/1909 | Thoens | 100/80 |
| 2,684,802 | 7/1954 | Rothwell | 100/43 |
| 2,731,782 | 1/1956 | Mason | 100/80 |
| 2,737,108 | 3/1956 | Galick | 100/98 A |
| 2,909,887 | 10/1959 | Claas | 100/7 |
| 3,379,123 | 4/1968 | Weltner | 100/98 A |
| 3,552,109 | 1/1971 | Murray et al. | 100/100 |
| 3,828,535 | 8/1974 | Lundahl | 56/344 |
| 4,118,198 | 10/1978 | Norback | 422/173 |
| 4,118,918 | 10/1978 | White | 100/50 |
| 4,175,487 | 11/1979 | Molitorisz | 100/8 |
| 4,193,251 | 3/1980 | Oosterling et al. | 100/53 |
| 4,302,923 | 12/1981 | Molitorisz | 100/3 |
| 4,455,930 | 6/1984 | Crawford | 100/3 |
| 4,464,889 | 8/1984 | Weelink | 100/177 |
| 4,803,832 | 2/1989 | Crawford | 100/80 |
| 4,945,719 | 8/1990 | Schrag et al. | 100/179 |

FOREIGN PATENT DOCUMENTS

| | | |
|---|---|---|
| 0072073 | 7/1982 | European Pat. Off. . |
| 139340 | 6/1901 | Fed. Rep. of Germany . |
| 0575954 | 4/1958 | Italy ............... 100/80 |
| 85234725/38 | 11/1985 | U.S.S.R. . |
| 0859836 | 1/1961 | United Kingdom ......... 100/98 A |

OTHER PUBLICATIONS

Farm Forum magazine, Summer 1989, pp. 22-23.
Farm Show magazine, vol. 14, No. 3, 1990, p. 27 and additional unnumbered pages.

Primary Examiner—Philip R. Coe
Assistant Examiner—Reginald L. Alexander
Attorney, Agent, or Firm—Jenner & Block

[57] ABSTRACT

A baling apparatus is provided for forming fibrous material into rectangular bales. The apparatus includes a bale chamber having a rectangular cross-section with a substantially vertically (typically 10°-12° from vertical) disposed inlet end. Structure is disposed forwardly of the bale chamber for delivering a mat of material to be baled to the bale chamber. The structure includes a conveyor having a vertically reciprocating discharge chute for discharging the mat of fibrous material in a vertical zig-zag pattern at the inlet end of the bale chamber to form successive layers of folded material within the bale chamber. Dedicated structure is provided for compressing the fibrous material with a flat surface at upper and lower portions of the bale chamber in a direction towards the rear of the bale chamber.

17 Claims, 11 Drawing Sheets

HAY BALER

FIELD OF THE INVENTION

The present invention relates to an apparatus and method for baling materials. More particularly, the present invention relates to a device and method for baling materials, including hay, into large rectangular bales.

BACKGROUND OF THE INVENTION

Many types of balers are known today. While balers have been in use for many years that form relatively small rectangular bales for manual handling, the technology is relatively new for devices that are suitable for forming relatively large bales for machine handling.

Several balers are known for forming relatively large rectangular or round bales. For example, U.S. Pat. No. 3,722,197 discloses a baler for producing large round bales of approximately four to five feet in width and having a similar diameter. While round bales generally have good field storage characteristics, they are difficult to handle and also difficult to stack in enclosed areas. Because of the propensity of a round bale to roll compared to a rectangular bale, additional care must be exercised in the handling of round bales.

Several types of large rectangular balers are known. For example, U.S. Pat. Nos. 3,552,109 and 4,118,918 disclose balers that are, in effect, scaled up versions of designs used for smaller 16×18 inch bales. This results in a device having a relatively heavy structure and high power requirements. Other balers for forming large rectangular bales utilize rotating feeding and compacting mechanisms. U.S. Pat. No. 4,803,832 discloses a relatively complex device that does not have a dedicated structure for compressing the hay in the baling chamber and utilizes rotating feeding and compacting structure. The device of U.S. Pat. No. 4,175,487 employs feeder-compactor rotating rollers that oscillate up and down across the intake port of the bale forming channel. U.S. Pat. No. 4,302,923 discloses a device and method in which the bale forming chamber is fed from the bottom and oscillates back and forth over a feeding mechanism. Alternatively, the feeding mechanism moves back and forth underneath the baling chamber. In both devices, rotating feeder-compactor rollers are utilized.

A need exists for a baler and baling method capable of forming large rectangular bales that is relatively simple in design and operation. A need also exists for a large rectangular baler that is capable of making vent holes in central portions of the bale that extend completely through the bale. A need further exists for a large rectangular baler that deposits the bale into the field so that the layers of hay in the bale are horizontally oriented.

Finally, a need exists for a bale construction of crop or other material, which may be hay, having improved rain shedding and drying characteristics.

SUMMARY OF THE INVENTION

In accordance with the present invention, a baling apparatus is provided for forming large rectangular bales.

The baling apparatus in accordance with one embodiment of the invention forms fibrous material into rectangular bales and includes a bale or baling chamber having a rectangular cross-section, a substantially vertically (typically 10 degrees-12 degrees from vertical) disposed inlet end and an outlet end, a top, bottom and sides. Structure disposed forwardly of the bale chamber is provided for delivering a mat of material to be baled to the bale chamber. This structure includes a conveyor having a vertically reciprocating discharge chute for discharging the mat of fibrous material in a vertical zig-zag pattern at the inlet of the bale chamber to form successive layers of folded material within the bale chamber. The end of the discharge chute reciprocates at a constant speed, which is preferably slightly less than the ground speed of the baler. This has the effect of helping to maintain the integrity of windrow and minimize leaf and feed value loss. Dedicated structure is provided for compressing the fibrous material with a flat surface at upper and lower portions of the bale chamber in a direction towards the rear of the bale chamber. The compressing structure is located forwardly of the bale chamber inlet and is periodically movable relative to the bale chamber through a compression stroke in which the flat surface moves in a direction towards the bale chamber and through a retraction stroke in which the flat surface moves away from the bale chamber inlet. The structure for compressing the fibrous material is synchronized with the discharge chute to permit delivery of fibrous material to the bale chamber inlet from the discharge chute where the compressing structure is retracted.

The baler in accordance with the invention may also include a movable gate located rearwardly of the bale chamber inlet for retaining the hay initially deposited during the formation of the first bale in the baling chamber when initially empty. The gate can move rearwardly along gate tracks extending longitudinally of the bale chamber as the first two bales are being formed. Structure is provided for opening the gate when the gate reaches the rear or outlet of the bale chamber. The baling apparatus typically will also include suitable structure for tying a bale located within the bale chamber.

In accordance with another embodiment of the invention, structure is provided for forming an aperture that extends through the length of the bale formed in the bale chamber. The aperture forming structure is composed of at least one spike member positioned on the flat compression surface for insertion into a bale or portion thereof during compression by the compressing structure.

Typically, the bottom of the bale chamber will be inclined slightly (about 10 degrees to 12 degrees) downwardly from front to rear and to reduce the tendency of hay to fall out of the inlet to the baling chamber during baling. In addition, this allows the bale chamber outlet to be located closer to the ground so that damage to the large bale upon discharge is minimized. Further, the incline also results in the bale being deposited in the field so that the layers of hay in the bale are horizontally oriented after discharge of the bale into the field.

In accordance with one embodiment of the invention, the conveyor for transporting the fibrous material to the baler inlet includes a conveyor that has a vertically reciprocating discharge chute that is preferably maintained a constant distance from the inlet of the baling chamber so that the end of the discharge chute moves up and down in a plane parallel to the transverse cross-section of the baling chamber inlet. The discharge chute vertically reciprocates up and down by pivoting about an upper portion of the conveyor. A lower portion of the conveyor may also pivot to permit proper alignment of the end of the discharge chute with the baling chamber inlet.

In accordance with another aspect of the present invention, a method of forming a substantially rectangular bale of fibrous material, such as hay, other crop material or paper, for example, is provided. The method includes forming a mat of the fibrous material and delivering the mat of fibrous material to be baled to a baling chamber having a rectangular transverse cross-section, an inlet and an outlet, in a vertical zig-zag pattern to form successive substantially vertical layers of folded material at the inlet of the bale chamber. Every other layer of the fibrous material is compressed by alternately applying a compressive force to the layers at the bale chamber inlet in a direction towards the rear of the baling chamber. The compressive force is alternately applied to top and bottom portions (preferably the top half and the bottom half) of the baling chamber inlet. When the bale has reached a desired size in the baling chamber, the delivery of the mat of fibrous material to the baling chamber is terminated.

In accordance with another aspect of the invention, the method may further comprise forming at least one aperture extending through the vertical layers of folded material during the compressing step.

After the bale has reached a desired size, the bale may be tied in the baling chamber and subsequently discharged into the field, preferably with the layers of the bale in the field being horizontally oriented.

In accordance with another aspect of the present invention, a vented bale construction is provided that improves the rain shedding and drying characteristics of the bale. The bale includes a mat of crop material folded and compressed in a zig-zag pattern into a plurality of successive parallel layers forming a rectangular bale. The bale is tied by suitable banding structure which may be twine or other suitable material that extends around the bale and is substantially perpendicular to the parallel layers of the bale for securing the bale together and for preventing the layers from separating. The bale further includes at least one vent aperture extending through the parallel layers of crop material for forming a vent/drain hole through the bale that allows the passage of air and water. In large rectangular bales, a plurality of spaced apart apertures will be provided that extend through the bale, typically at a spacing of about 16 inches.

In accordance with another aspect of the invention, a method of storing a crop bale in the field which provides improved rain shedding and decreased spoilage is provided. The method comprises storing the previously described vented bale with the vent/drain holes in a vertical orientation.

DETAILED DESCRIPTION OF THE INVENTION

Figure 1:
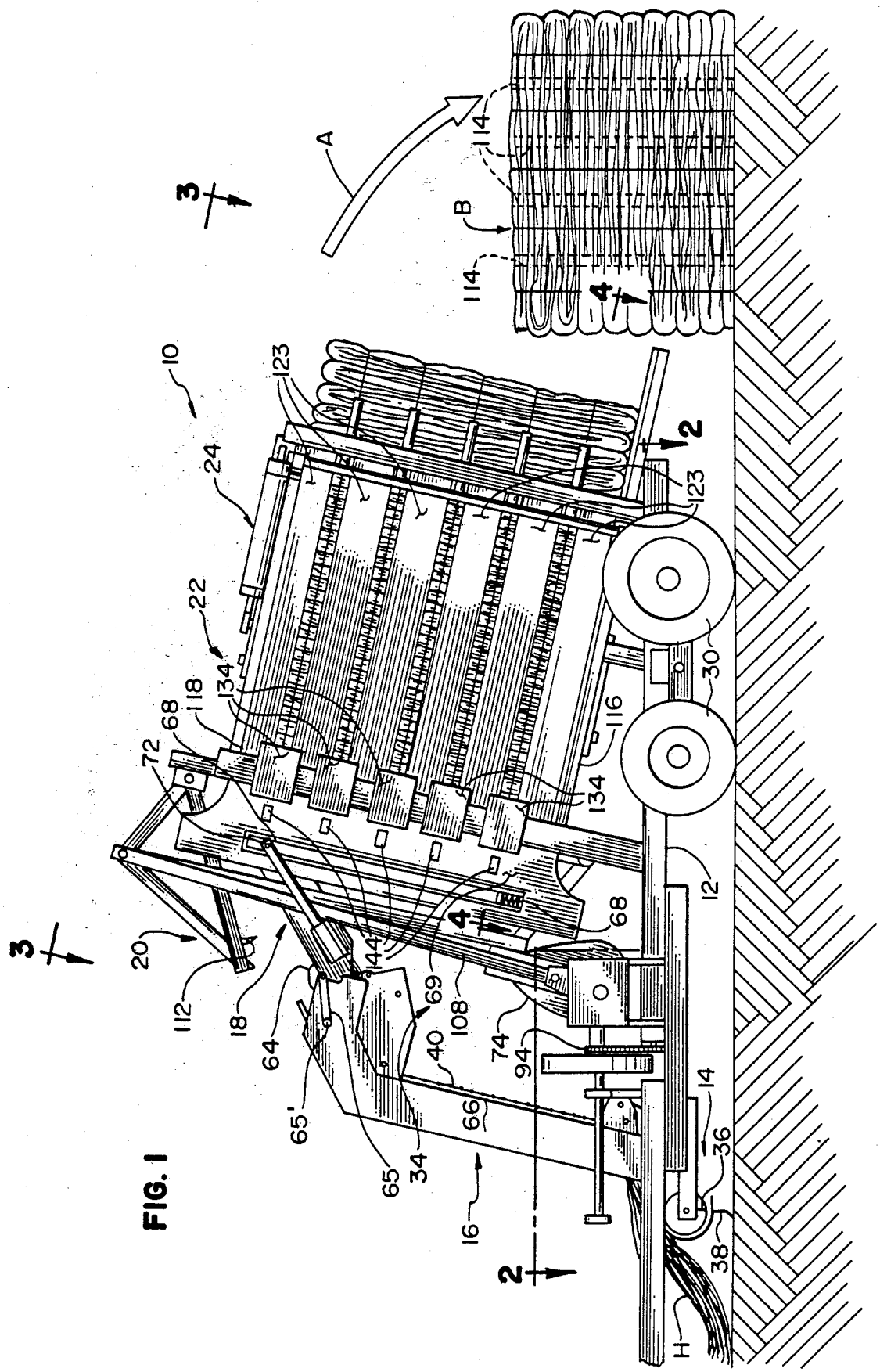
FIG. 1 is a side elevation view of a baler in accordance with the present invention, with a portion of the front baler frame being omitted.

Referring generally to the FIGS., where like reference numerals refer to like elements, and in particular referring to FIG. 1, there is illustrated a baler 10 in accordance with the invention. While this description of the invention is in reference to agricultural apparatus and in particular for mobile use drawn by a tractor or other vehicle on a field of cut fibrous agricultural crops such as hay, straw or haylage, it is to be understood that the invention is capable of wider application than agricultural uses. For example, the invention is suitable for the baling and compaction of other fibrous material, such as paper and refuse. For the compaction of paper, refuse and other materials, a baling device of the present invention could be oriented so that the inlet to the baling chamber is substantially horizontal and the bale is formed below the inlet. The invention is also suitable for operation in stationary or other mobile modes. Also, while the particular described embodiment is tractor drawn, it is to be understood that the invention could also be utilized as a self-powered device incorporating a propulsion mechanism.

Baler 10 is capable of forming large rectangular bales of baleable material, which in the illustrated embodiment is hay. Baler 10 is suitable for forming, for example, hay bales about 4 feet by 7 feet by 5 feet and the bale size (length relative to the bale chamber) can be varied as hereinafter described. It is anticipated that the density of hay bales made by the apparatus of the present invention can be up to about 14 pounds per cubic foot or more.

As illustrated in the FIGS., the primary elements of baler 10 include a frame 12, a hay pick-up mechanism 14, a pivotable conveyor 16 that includes a vertically reciprocating conveyor discharge chute 18, a compressing mechanism 20, a rectangular baling chamber 22 and a tying and knotting system 24.

Figure 5:
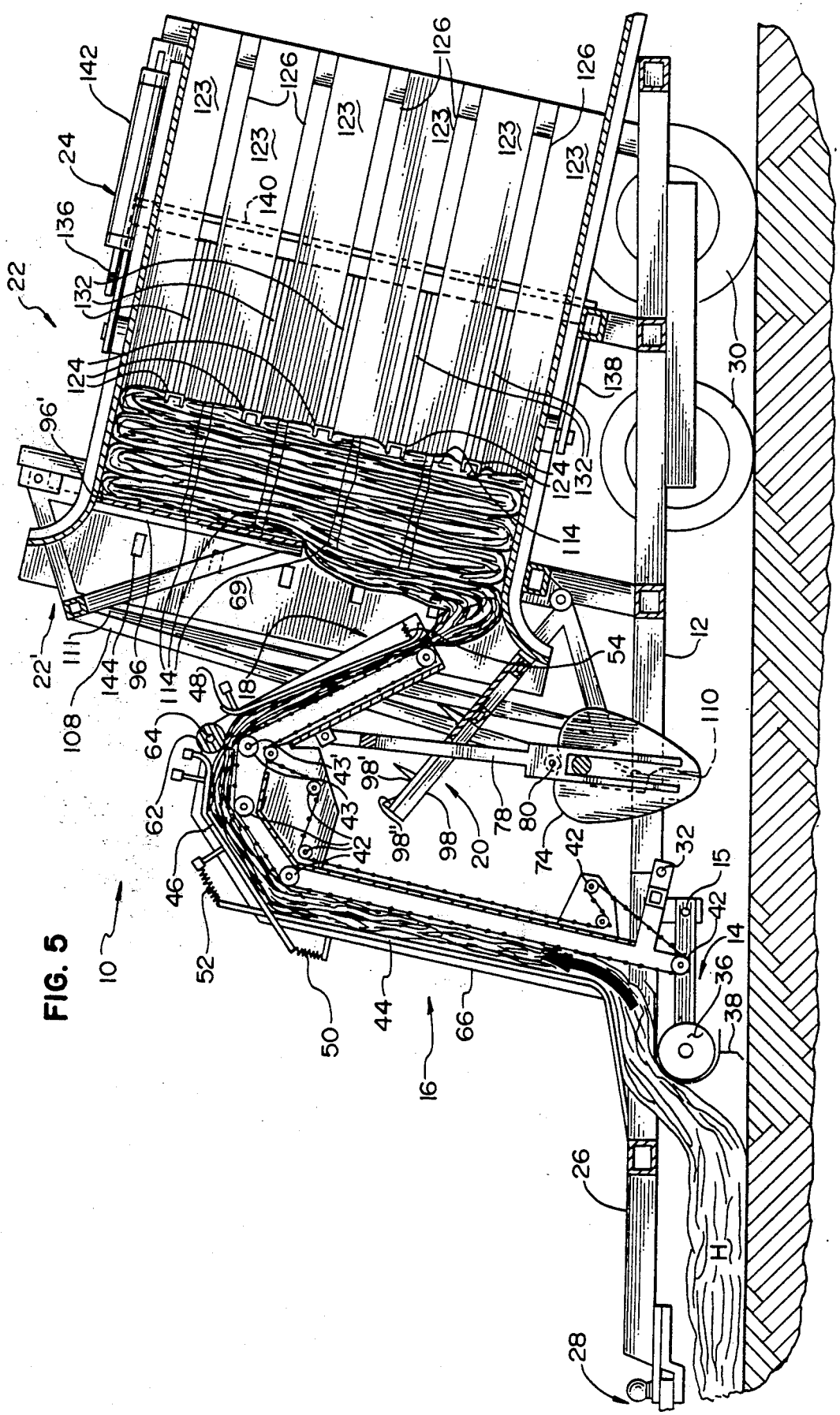
FIG. 5 is a sectional view of the hay baling apparatus along lines 5—5 of FIG. 2 and further illustrates the front frame and hitch portion of the baler in accordance with the invention.

As illustrated in FIG. 5, frame 12 of baler 10 has mounted thereto a forwardly extending tongue 26 that is hitched to a tractor drawbar 28. Secured to frame 12 are ground traversing wheels 30. Baling chamber 22 is mounted above frame 12, preferably at an incline extending downwardly from the front to the rear of baling chamber 22. Typically, the amount of incline will be in the range of from about 10 to 12 degrees from horizontal. The incline facilitates the formation of a bale and also helps prevent hay from falling out of the inlet to the bale chamber during baling and facilitates bale orientation so that the bale B when discharged, tips over and falls on its side, as shown in FIG. 1 and indicated by arrow A with vent/drain apertures 114 extending vertically through bale B. In this orientation, bale B lays in the field after discharge with the layers of hay in a horizontal position resulting in improved rain shedding. In addition, the vertically extending vent apertures 114 help to shed and drain water from the bale and also act as air vents to facilitate drying of the hay or other material that may be baled in accordance with the invention. Preferably, vent apertures 114 will be spaced about 16" apart.

Figure 6:
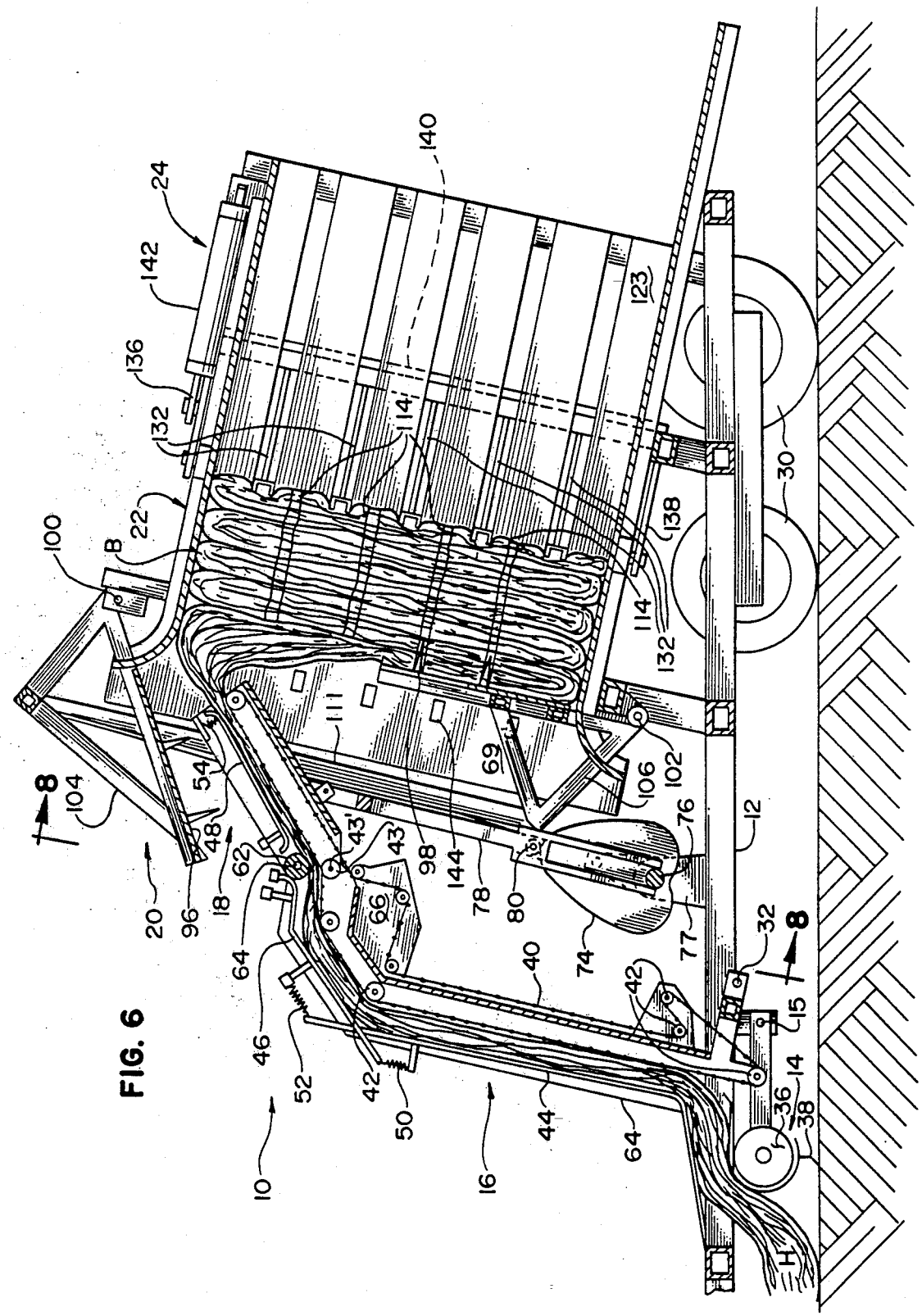
FIG. 6 is a sectional side elevation view of the hay baler similar to FIG. 5 but illustrating operation of the baler when the discharge chute is located in the upper position.
Figure 7:
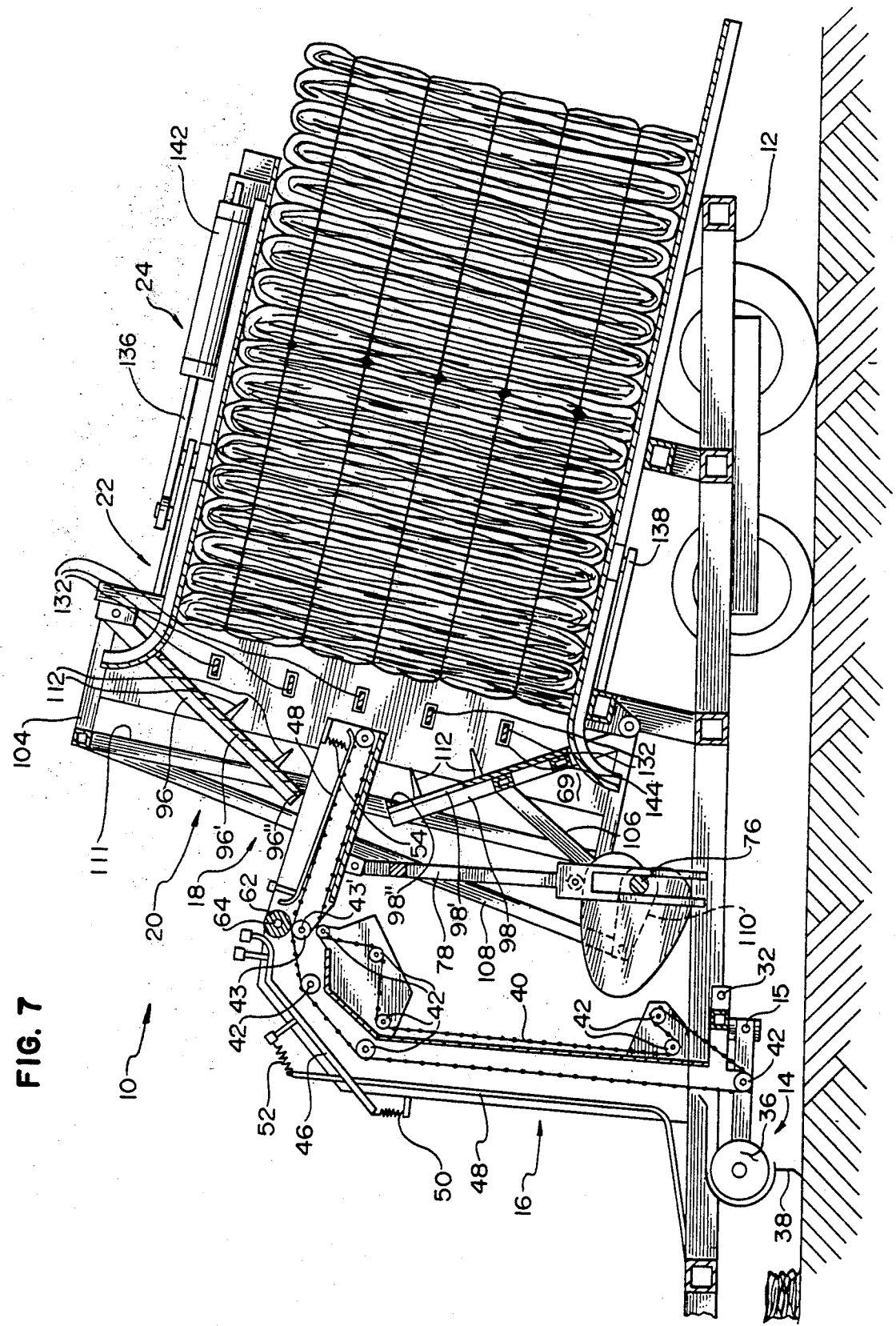
FIG. 7 illustrates the hay baler of FIG. 1 in sectional view similar to FIG. 5 illustrating the operation of the hay baler when the discharge chute is in the middle position and the needle mechanism is activated to tie the bale.

Conveyor 16 is pivotably mounted to frame 12 to permit pivotal movement of conveyor 16 about lower conveyor pivot 32 in a direction towards and away from baling chamber 22 as conveyor discharge chute 18 moves up and down as illustrated in FIGS. 5–7.

Also mounted to frame 12 is a reciprocating drive mechanism 34 for reciprocating conveyor discharge chute 18 up and down across the inlet of baling chamber 22 and for driving hay compressing mechanism 20, shown in FIGS. 5–7 and hereinafter described in detail.

Referring to FIGS. 1–2 and 5–7, hay pick-up mechanism 14 and conveyor 16 together function to pick up, form the hay or other crop material into a mat and deliver the mat of material to bale chamber 22.

In the illustrated embodiment, hay pick-up mechanism 14 is mounted to frame 12 for delivering hay or other crop material to conveyor 16 for baling. Pick-up mechanism 14 can pivot about pivot point 15 with respect to frame 12 to help allow pick-up mechanism 14 to traverse uneven surfaces in the field. Pick-up mechanism 14 is a conventional crop pick-up mechanism and is therefore not described in detail. Any suitable crop pick-up mechanism for delivering the hay or other material to conveyor 16 can be utilized.

Figure 11:
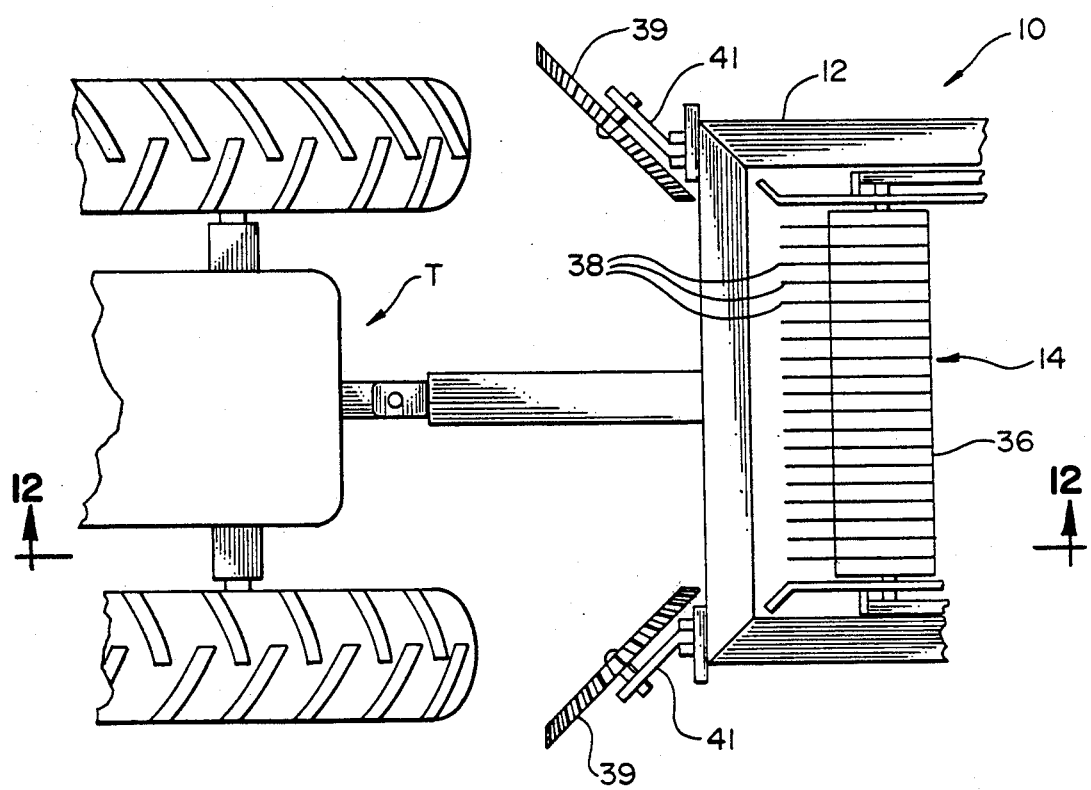
FIG. 11 is a top plan view of an alternate embodiment pick up mechanism in accordance with the present invention.
Figure 12:
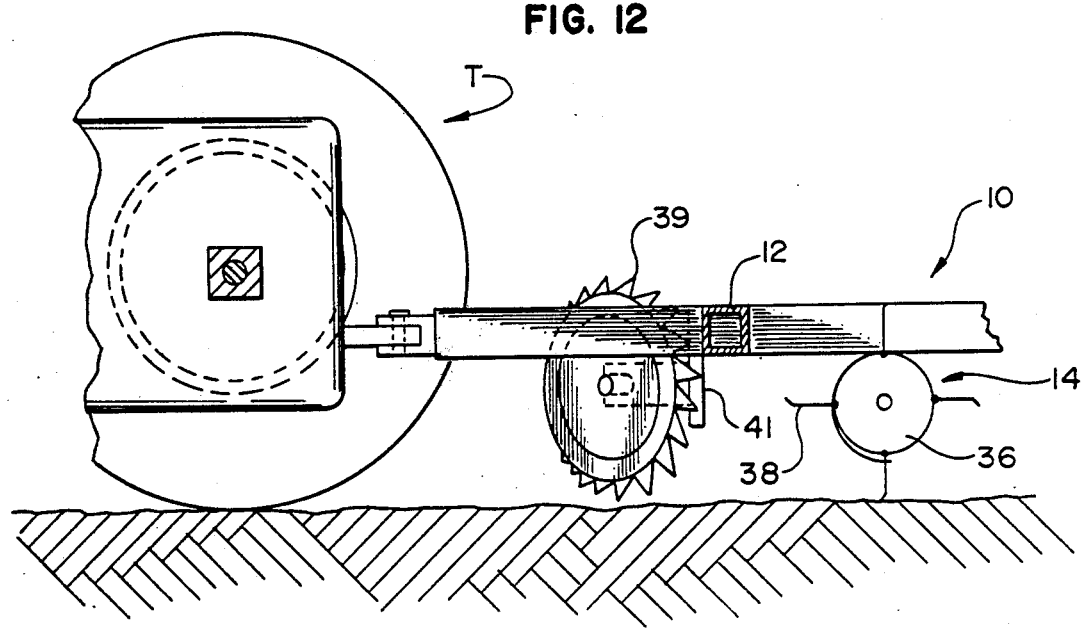
FIG. 12 is a sectional view of the pick up mechanism along lines 12—12 of FIG. 11.

Mechanism 14 can be driven in a known manner by the tractor power takeoff (not shown) and includes a rotatable drum 36, in this embodiment four feet wide, from which extend a plurality of spaced apart crop pick-up tines 38. Drum 36 rotates in a clockwise direction and tines 38 pick up hay H from the field which typically will be in the form of a windrow of desired width. As illustrated in FIGS. 11 and 12, for picking up windrows wider than the width of drum 36 (4 feet), baler 10 pulled by tractor T may be provided with a rotatable rake wheel 39 on either side of the pick-up. Rake wheels 39 are ground driven, flexible and are mounted to the corners of frame 12 by means of suitable mounting structure 41. Such rake wheels and mounting structure are well known in the art and therefore are not described in detail herein. Alternatively, a wider pick-up may be used with a short stub auger or other mechanism on either side just behind the pick-up to gently compress the windrow to 4' wide (not shown). The front part of the frame would have to be raised or widened to accommodate a wider pick-up (not shown). Wide windrows are desirable to help ensure a full fill across the bale chamber from side to side at each layer and helps avoid a loaf-shaped bale.

Pivotable conveyor 16 includes a driven endless chain bed 40 for carrying hay H in a mat to baling chamber 22. Chain bed 40 traverses a series of guide sprockets 42 and a sprocket 43, mounted at various locations along each side of chain bed 40 to provide the illustrated travel path for chain bed 40.

Conveyor 16 further includes reciprocating conveyor discharge chute 18, the end of which periodically traverses at a constant speed the inlet of baling chamber 22 for discharging the hay or other material to be baled in a substantially vertical zig-zag pattern to form successive layers of equal thickness of folded hay within baling chamber 22. The end of conveyor discharge chute 18 is maintained at a constant distance from the inlet 22' of baling chamber 22 to facilitate formation of a uniform bale.

Hay guides or wind guards 44, 46 and 48 are provided to maintain hay H on chain bed 40. Each of hay guides 44, 46 and 48 is spring biased by means of springs 50, 52 and 54, respectively, to allow contact despite varying hay depth and density on chain bed 40. Each hay guide 44, 46 and 48 consists of three spaced apart parallel guide bars extending parallel to the direction of travel of chain bed 40. A greater or lesser number of guide bars could be used.

A compression roller 62 extends across the width of chain bed 40 and compresses hay H on chain bed 40 to help form a mat. Compression roller 62 is mounted for rotation about a bearing 64. Arm 65 pivots about point 65' and carries roller 62 and is spring biased by a spring to allow accommodation of varying thickness in the hay carried by chain bed 40.

Conveyor 16 may also include suitable side guards 66 on either side of conveyor 16.

Figure 3:
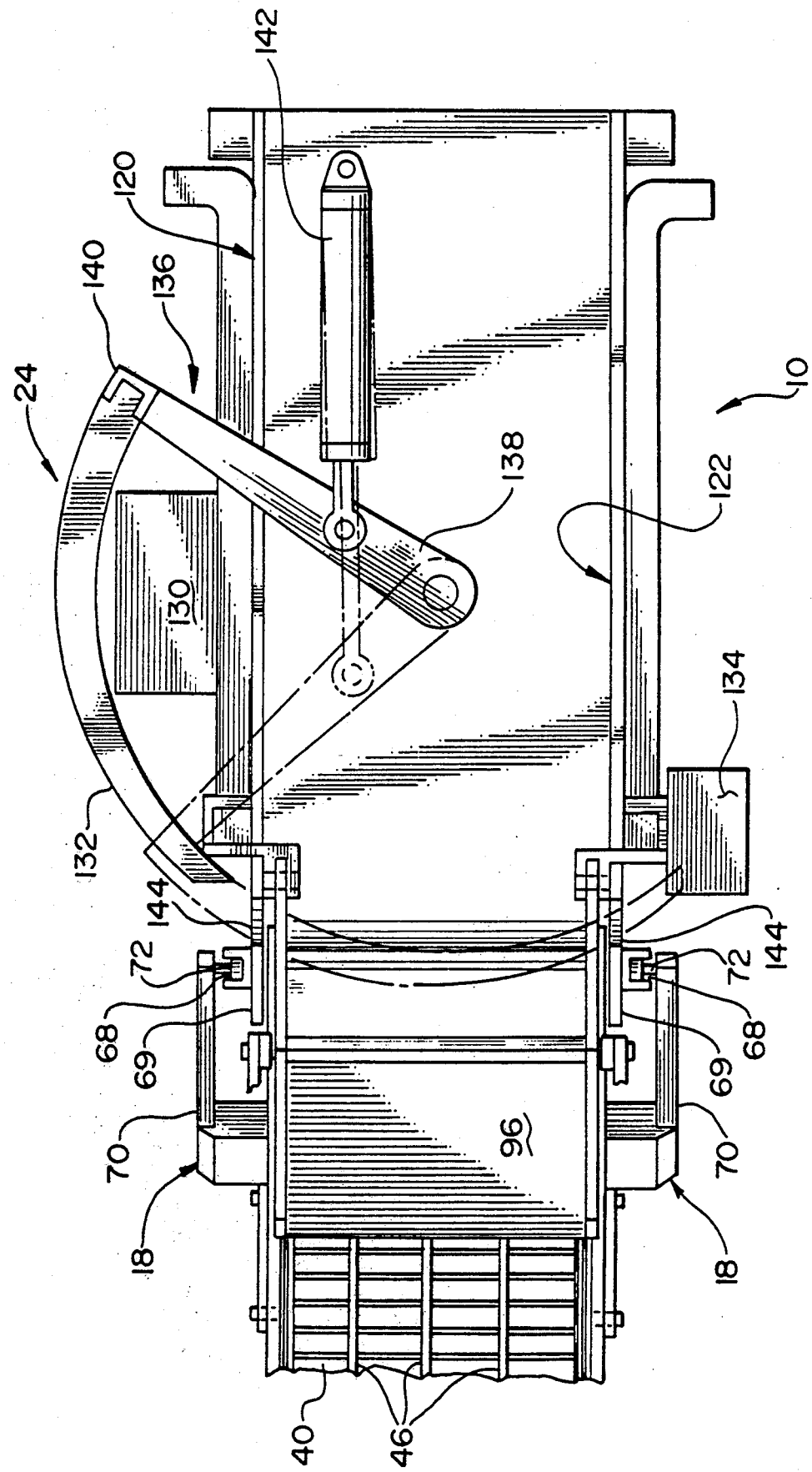
FIG. 3 is a top view of a portion of the hay baler along lines 3—3 of FIG. 1 illustrating movement of the needle mechanism.

The end of conveyor discharge chute 18 is driven up and down at a constant velocity and is maintained at a constant distance from the inlet of chamber 22, which is the distance of the end of chute 18 normal to the substantially vertical plane formed by the inlet of chamber 22. In order to maintain a constant distance, conveyor discharge chute 18 pivots about bearing 43' of sprocket 43 and conveyor 16 pivots about lower conveyor pivot 32. As shown in FIG. 1, a guide track 68 is provided on sides 69 at inlet 22' of chamber 22, parallel to the vertical inlet plane of baling chamber 22 and normal to the bottom of baling chamber 22. An arm 70 has one end rigidly fixed to conveyor discharge chute 18 and has a guide track traversing wheel mounted on the opposite end. As conveyor discharge chute 18 is reciprocated up and down, guide track traversing wheel 72 traverses track 68 and maintains the end of conveyor discharge chute 18 at a constant normal distance from the inlet of baling chamber 22. A spring 68' is located at the bottom of track 68 to facilitate return of wheel 72 along track 68. A similar guiding mechanism is provided on the other side of baler 10, as illustrated in FIG. 3. In accordance with another embodiment (not shown) guide track 68 could be curved (for example with the ends curving towards the front of baler 10) so that the end of discharge chute 18 would vary in distance from inlet to vary the geometry of the hay fold.

Figure 8:
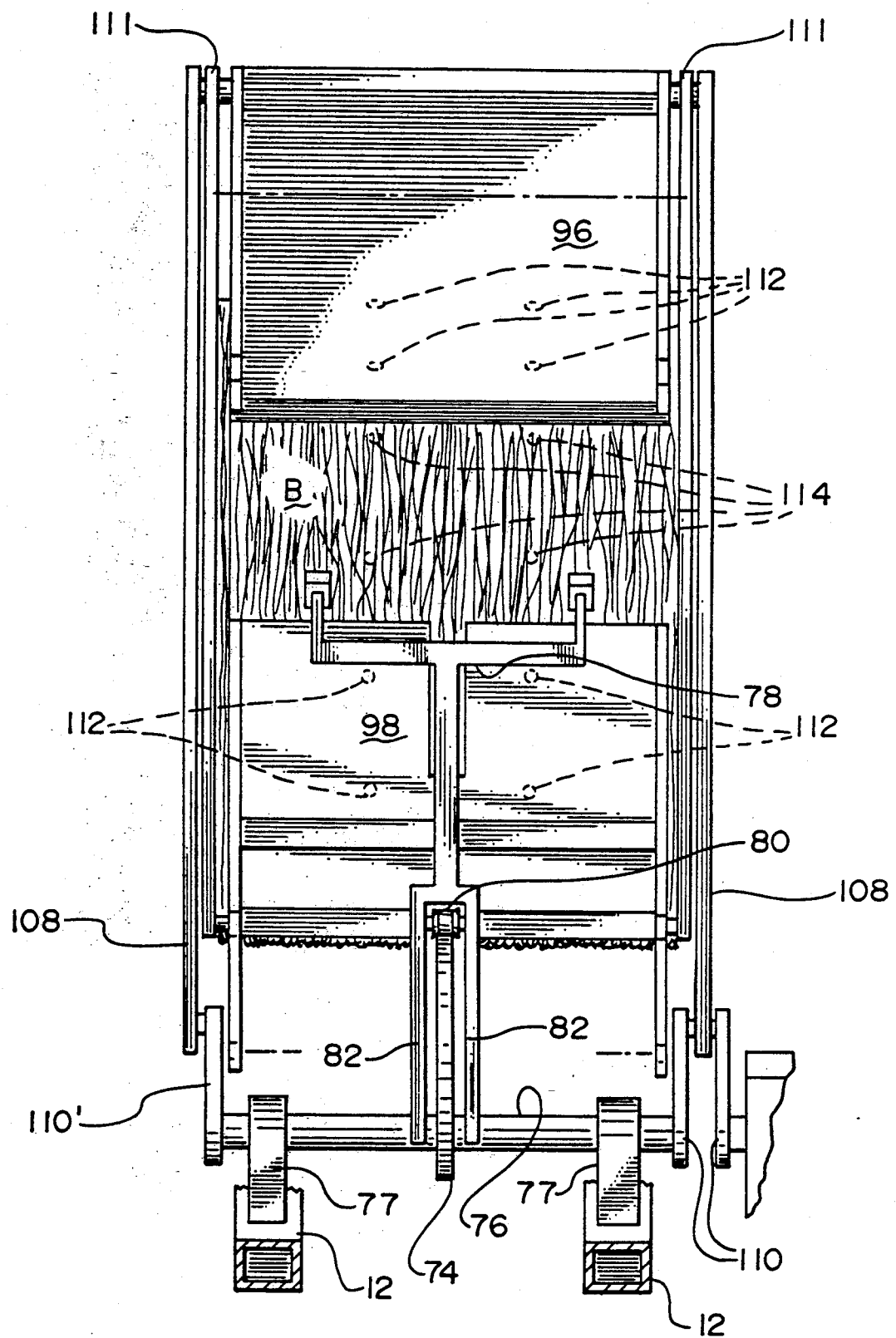
FIG. 8 is a front elevation view along lines 8—8 of FIG. 6.

Driving of conveyor discharge chute 18 is accomplished by means of a driven cam 74. Cam 74 is driven by a shaft 76, supported by shaft support 77 attached to frame 12, which also drives compressing mechanism 20, hereinafter described. As illustrated in FIGS. 6 and 8, a Y-shaped driving arm 78 is pivotally attached to conveyor discharge chute 18 and has a cam follower 80, which in this case is a roller, for traversing the surface of cam 74. Two pairs of spaced apart legs 82 extend downwardly from the end of arm 78. Legs 82 are spaced apart about the diameter of shaft 76 which is located therebetween and act as a guide to maintain the bottom end of arm 78 in a desired vertical relation relative to shaft 76. Cam 74 is shaped to provide a constant speed for the discharge end of conveyor chute 18. As cam 74 is rotated by shaft 76, cam follower 80, and thus arm 78 and conveyor discharge chute 18, is raised and lowered across the inlet of baling chamber 22 at a constant speed.

Figure 2:
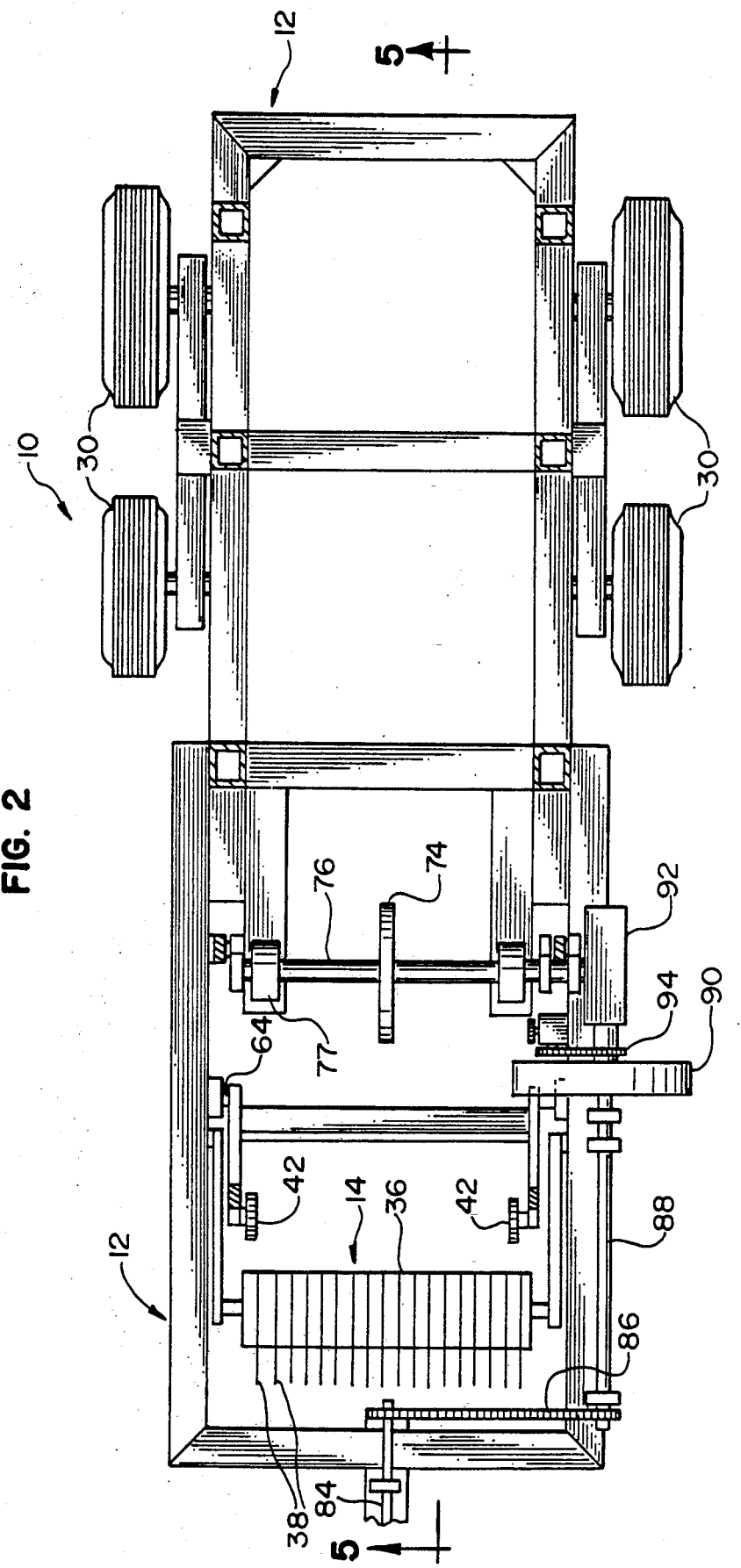
FIG. 2 is a sectional plan view of the baler along lines 2—2 of FIG. 1.

As shown in FIG. 2, shaft 76 is driven by tractor power takeoff 84 which, in turn, drives a chain 86, connected to a shaft 88. Shaft 88 rotates a flywheel 90 to help insure constant velocity, especially during maximum compression by compressing mechanism 20 and provides input to a gearbox 92 which, in turn, drives shaft 76 at a desired speed. Shaft 88 also drives a chain 94 which drives chain bed 40 by suitable mechanism (not shown).

Compressing mechanism 20 is best illustrated in FIGS. 1, 5-7 and 8. Compressing mechanism 20 includes upper and lower packing members 96 and 98, respectively, for alternately compressing hay in the upper half and bottom half of the inlet of baling chamber 22. When one of packing members 96 or 98 is compressing the hay into baling chamber 22, the other packing surface is retracted permitting conveyor discharge to deposit hay at the inlet of baling chamber 22. As illustrated in FIGS. 1 and 6, upper packing member 96 is retracted and lower packing member 98 is compressing hay into the bottom half of the baling chamber inlet. Each packing member 96 and 98 has a planar surface 96' and 98', respectively, for compressing hay into the inlet of the baling chamber. The end of each packing member 96 and 98 has a lip 96" and 98", respectively, that extends horizontally along the edge of packing members 96 and 98. Lips 96" and 98" form a slight indentation in the hay as it is packed into baling chamber 22 to provide resistance to movement of the hay in the baling chamber not being compressed as the upper or lower portion of the bale is being compressed by compressing mechanism 20.

Upper and lower packing members 96 and 98 are mounted for pivotal movement about pivot points 100 and 102, respectively. Triangular frames 104 and 106 reinforce flat surfaces 96' and 98', respectively, and facilitate the driving of packing members 96 and 98. Packing member 96 is driven by a crank arm 108 which is attached to frame 104 and which is driven by crank 110 attached to and rotated by shaft 76. A drive arm 111 extends from frame 104 to frame 106 to drive lower packing member 98. The length of crank 110 is chosen to provide the proper amount of rotational movement of packing members 96 and 98 about pivot points 100 and 102, respectively, so that there is proper compressing action and sufficient clearance to permit conveyor discharge chute 18 to travel up and down at the inlet of baling chamber 22. A crank 110' is located on the other side of baler 10 at the end of shaft 76 together with another crank arm 108 and drive arm 111.

Each packing member 96 and 98 has mounted normal to its planar surface 96' and 98' four spike members 112. As a packing member 96 or 98 compresses the hay into baling chamber 22, spikes 112 are driven into the hay thereby forming holes. The length of spikes 112 is equal to or greater than the compressed thickness of the hay deposited in one cycle of conveyor discharge chute 18 so that four essentially continuous vent holes are formed in the bale. FIG. 8 illustrates a number of vent holes 114 in bale B being formed in baling chamber 22.

Various aspects of baling chamber 22 are illustrated in FIGS. 1 and 3-7. Baling chamber 22 is rectangular in transverse cross-section normal to the bottom thereof and is composed of a bottom 116, a top 118 and two side walls 120 and 122, composed of spaced apart slats 123. Preferably, the sides of baling chamber 22 taper inwardly slightly (about 2 inches, for example) from the front to the rear of baling chamber 22 to provide increased resistance to bale discharge to assist in compacting. The taper can be adjustable (not shown) in a known manner to provide more or less resistance to discharge as desired for different types of or variations in crop materials. Chamber 22 preferably is of sufficient length to contain up to two completed bales as illustrated in FIG. 7. As the third bale is formed, the other two bales are pushed back until the rearmost bale is discharged as shown in FIG. 1.

A gating system is provided in baling chamber 22 and includes a set of two movable gates 124 each having five fingers, a gate track 126 and guides 128 for each gate which traverse tracks 126. When baler 10 is empty, that is, for formation of the first bale, gates 124 are manually set in the position shown in FIG. 4. Tying and knotting system 24, which includes twine supply 130, five vertically spaced needles 132, knotters 134 and a drive mechanism that includes a pair of drive arms 136 and 138 connected by an arm 140 driven by a hydraulic cylinder 142, passes twine across gates 124 to knotter 134. As hay is fed, folded and compacted into baling chamber 22, gates 124 are pushed toward the rear of baling chamber 22 by the force of the hay feeding and compacting. Additional twine is fed by twine supply 130, a separate strand for each of five needles 132. When the first bale is completed, discharge chute 18 and conveyor 16 are stopped in the position illustrated in FIG. 7 and cylinder 142 is activated to advance needles 132 through needle openings 144 in sides 69 of inlet 22' of chamber 22 and carry the twine strands to knotter 134 where the bale is tied as illustrated in FIG. 7, when both packing members 96 and 98 are partially retracted. A similar procedure occurs for the next bale. The size of the bale can be varied by tying the bale in chamber 22 when it has reached a desired size (length).

Figure 4:
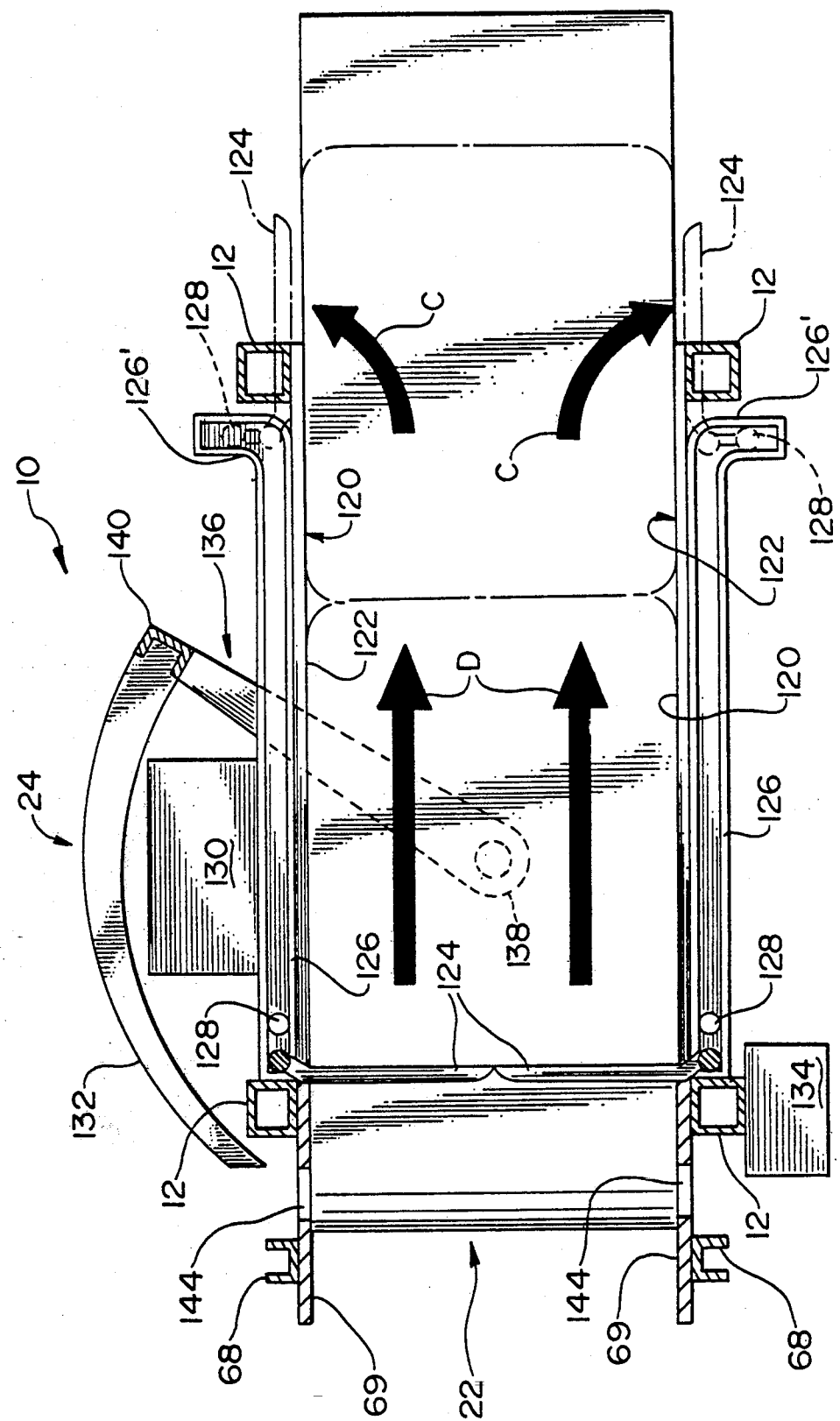
FIG. 4 is a partially cut away plan view of the hay baler along lines 4—4 of FIG. 1 showing operation of the gating system used in forming the first bale.

As the first bale continues toward the rear of baling chamber 22 during formation of the second bale, gates 124 continue to be moved toward the rear of baling chamber 22 indicated by arrows D until gates 124 open when guides 128 traverse curved portion 126' of tracks 126 as illustrated in phantom lines in FIG. 4 and indicated by arrows C. Gates 124 remain in this open position until manually moved forward to the initial position after the baler is emptied.

The operation of a full cycle of conveyor 16 and compressing mechanism 20 will now be described with respect to FIGS. 1-2 and 5-8. The illustrated cycle begins with conveyor discharge chute 18 at its uppermost location and compressing mechanism 20 having upper packing member 96 fully retracted and lower packing member 98 fully advanced, as illustrated in FIGS. 1, 6 and 8. As shaft 76 rotates counterclockwise, cam 74 also rotates and cam follower 80 follows the surface of cam 74 thereby lowering arm 78 and conveyor discharge chute 18 as guide tracks traversing wheel 72 moves downwardly in guide track 68. FIG. 7 illustrates the position of conveyor 16 and compressing mechanism 20 after shaft 76 has rotated one quarter turn from the position illustrated in FIG. 6. Upper packing member 96 has advanced from its fully retracted position towards the inlet of baling chamber 22 while lower packing member 98 has withdrawn from its fully advanced position as cranks 110 and 110' lower drive arms 111 and will continue to retract as shaft 76 rotates to avoid interference with conveyor discharge chute 18 as it travels in front of the bottom portion of the inlet of baling chamber 22. Conveyor 16 has pivoted about lower pivot point 32 and conveyor discharge chute 18 has pivoted about bearing 43', as shown in FIG. 7.

The lowest position of conveyor discharge chute 18 is illustrated in FIG. 5. Upper packing member 96 has fully advanced into the inlet of baling chamber 22 to compress the hay therein as cranks 110 and 110' have reached their lowest position. Similarly, lower packing member 98 has reached its fully retracted position away from the inlet to baling chamber 22. As shaft 76 continues to rotate in a counterclockwise direction, conveyor discharge chute 18 will start to raise, upper packing member 96 will retract and lower packing member 98 will advance towards the inlet of baling chamber 22 driven by drive arms 111.

Figure 9:
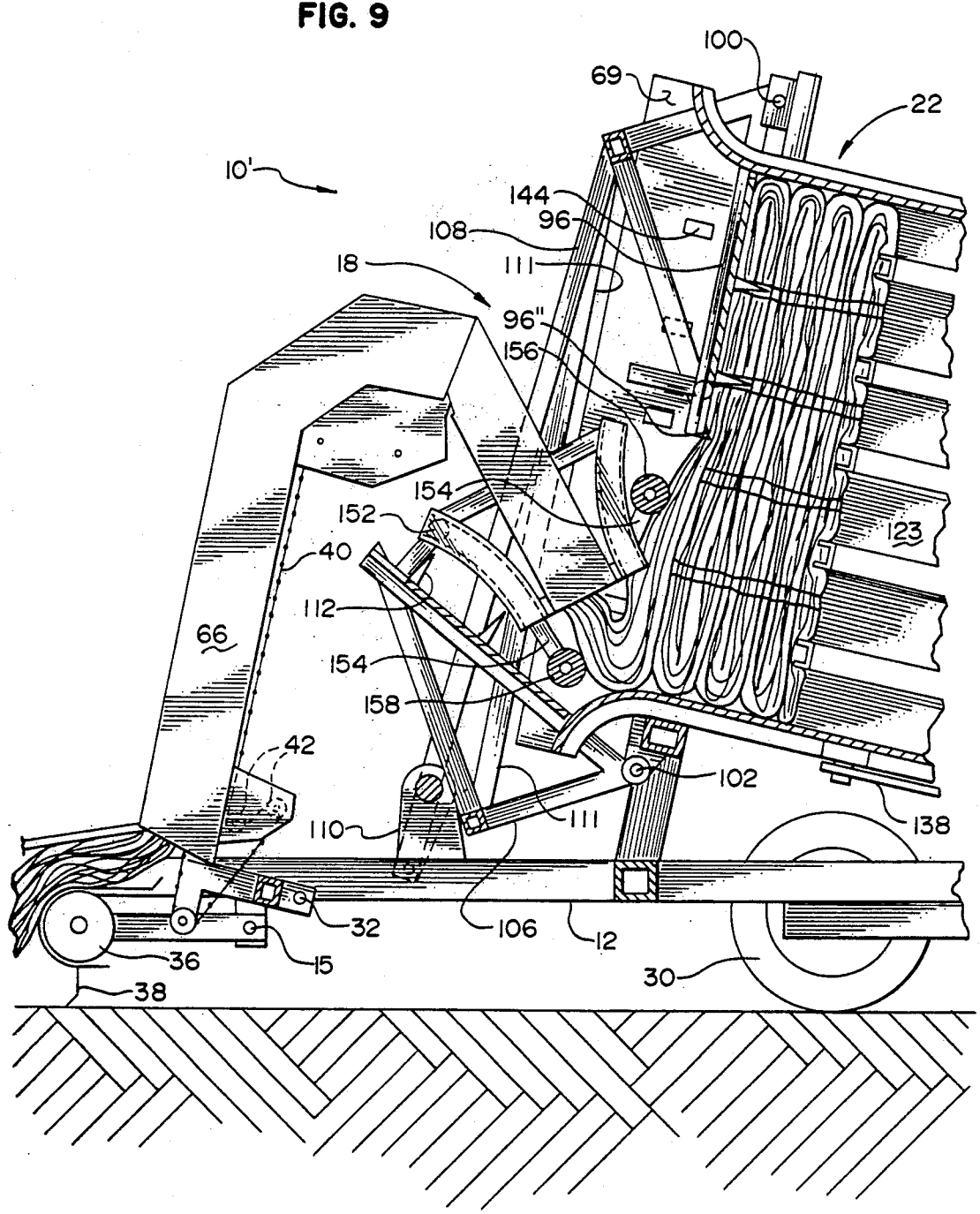
FIG. 9 illustrates an alternative embodiment of a portion of a hay baler in accordance with the present invention.
Figure 10:
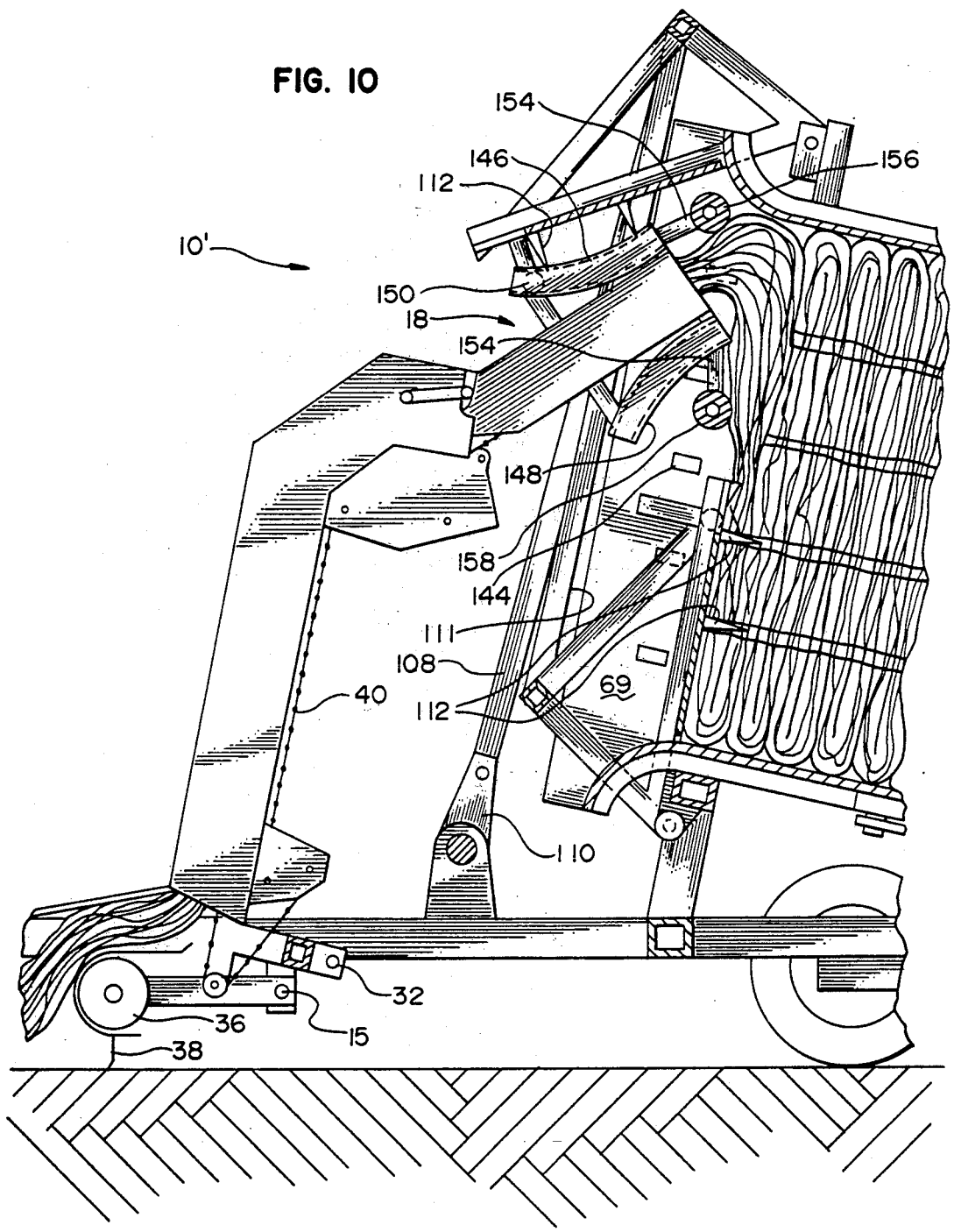
FIG. 10 illustrates the hay baler embodiment of FIG. 9 during operation in which the discharge chute is located in the topmost position.

Referring to FIGS. 9 and 10 there is illustrated a portion of a hay baler 10', another embodiment in accordance with the invention. Hay baler 10' is similar to hay baler 10 previously described, except that a different mechanism is utilized to move conveyor discharge chute 18 up and down in front of the inlet to baling chamber 22. Up and down movement of the end of conveyor discharge chute 18 is accomplished by means of upper and lower arcuate tracks 146 and 148 mounted on uppermost lower portions of conveyor discharge chute 18. Drive wheels 150 and 152 depend from upper and lower packing members 96 and 98, respectively, and are positioned to drive conveyor discharge chute 18 up and down by passage through arcuate tracks 146 and 148 as drive wheels 150 and 152 move with upper and lower packing members 96 and 98. Arcuate tracks 146 and 148 are curved in a manner so that a constant vertical speed at the end of discharge chute 18 adjacent bale chamber inlet is provided by passage of drive wheels 150 and 152, respectively.

Arms 154 to which hay retention rollers 156 and 158 are mounted are lightly sprung by a torsion spring (not shown), for example, against the uncompacted mat H of hay to keep the hay from falling from the inlet to baling chamber 22. If desired, hay retention rollers or similar structure could also be utilized with hay baler 10 previously described.

While the invention has been described with respect to certain preferred embodiments, it is to be understood that the invention is capable of numerous changes, modifications and rearrangements without departing from the scope or spirit of the invention as defined in the claims.

I claim:
1. A baling apparatus for forming fibrous material into rectangular bales comprising:
a bale chamber having a rectangular cross-section, an inlet and an outlet, top, bottom and sides;
delivery means disposed forwardly of the bale chamber for forming and delivering a mat of material to be baled to the bale chamber, the delivery means comprising conveyor means having a vertically reciprocating discharge chute for discharging the fibrous material in a vertical zig-zag pattern at the inlet of the bale chamber to form successive substantially vertical layers of folded material within the bale chamber;
compressing means for periodically alternately compressing the fibrous material with a flat surface in upper and lower portions of the bale chamber in a direction towards the rear of the bale chamber, the compressing means located forwardly of the bale chamber inlet and being periodically moveable through a compression stroke towards the bale chamber and through a retraction stroke away from the bale chamber inlet and synchronized with said discharge chute to permit delivery of fibrous material to the bale chamber inlet from the discharge chute where said compressing means is retracted.

2. The apparatus of claim 1 further comprising movable gate means located rearwardly of the bale chamber inlet for selectively restraining fibrous material of the first bale or portion thereof contained in the bale chamber.

3. The apparatus of claim 2 wherein the gate means is movable along gate tracks extending longitudinally of the bale chamber, said gate tracks comprising a curved portion at the rear of the baling chamber for opening said gate means when said gate means reaches the outlet of the bale chamber.

4. The apparatus of claim 2 further comprising gate opening means for placing and maintaining the gate means in an open position when the gate means reaches the outlet of the bale chamber.

5. The apparatus of claim 2 further comprising knotting means for tying a bale located within the bale chamber, and wherein said gate means comprises a plurality of vertically spaced fingers.

6. The apparatus of claim 1 further comprising aperture forming means for producing an aperture extending through the length of a bale formed in the bale chamber.

7. The apparatus of claim 6 wherein said aperture forming means comprises at least one spike member located on said compressing means for insertion into a bale or portion thereof during compression by said compressing means.

8. The apparatus of claim 1 wherein the bottom of the bale chamber is inclined downwardly from front to rear.

9. The apparatus of claim 1 further comprising a discharge chute drive means for vertically reciprocating the discharge chute of the delivery means.

10. The apparatus of claim 9 further comprising means for maintaining the opening of the discharge chute a predetermined distance from the inlet of the baling chamber.

11. The apparatus of claim 9 wherein the discharge chute drive means includes a vertically disposed arm attached to the discharge chute and a cam having a cam surface for periodically vertically raising and lowering the arm to thereby vertically reciprocate the discharge at the inlet of the baling chamber.

12. The apparatus of claim 1 wherein said compressing means operates to compress the fibrous material after every other layer is deposited to the inlet of the bale chamber.

13. The apparatus of claim 11 wherein the cam is driven by a shaft.

14. The apparatus of claim 9 wherein said compressing means includes a compressing drive means including a shaft driven crank, and a crank arm connecting the crank to an upper pivotable planar surface mounted for pivotal movement.

15. The baling apparatus of claim 1 wherein the compressing means includes upper and lower packing members having a planar packing surface for alternately compressing fibrous material into an upper and lower portion of the baling chamber inlet.

16. The baling apparatus of claim 15 wherein each of said upper and lower packing members are mounted for pivotal movement about a different pivot point.

17. The baling apparatus of claim 16 wherein said compressing means includes a shaft driven crank and a crank arm connecting the crank to said packing members.

* * * * *